United States Patent
Deu-Ngoc et al.

(10) Patent No.: US 9,706,581 B2
(45) Date of Patent: Jul. 11, 2017

(54) METHOD AND APPARATUS FOR BACK-OFF ALGORITHM HAVING DIFFERENT RETRY TIME CLASSES

(75) Inventors: Joseph Tu-Long Deu-Ngoc, Maryhill (CA); Jeremy Thompson, Waterloo (CA)

(73) Assignee: BlackBerry Limited, Waterloo (CA)

(*) Notice: Subject to any disclaimer, the term of this patent is extended or adjusted under 35 U.S.C. 154(b) by 628 days.

(21) Appl. No.: 12/940,336

(22) Filed: Nov. 5, 2010

(65) Prior Publication Data
US 2011/0296039 A1 Dec. 1, 2011

Related U.S. Application Data

(60) Provisional application No. 61/349,971, filed on May 31, 2010.

(51) Int. Cl.
*G06F 15/16* (2006.01)
*H04W 74/08* (2009.01)
*H04W 76/02* (2009.01)

(52) U.S. Cl.
CPC ........ *H04W 74/085* (2013.01); *H04W 76/022* (2013.01)

(58) Field of Classification Search
CPC .................................................... H04L 1/1883
USPC ........................................................ 709/228
See application file for complete search history.

(56) References Cited

U.S. PATENT DOCUMENTS

| | | | | |
|---|---|---|---|---|
| 5,774,479 A * | 6/1998 | Lee et al. | | 714/749 |
| 6,522,635 B1 * | 2/2003 | Bedwell | | H04B 7/18528 370/314 |
| 6,567,416 B1 * | 5/2003 | Chuah | | H04L 12/2602 370/347 |
| 6,628,629 B1 * | 9/2003 | Jorgensen | | H04L 1/20 370/322 |
| 7,339,892 B1 * | 3/2008 | Engwer | | H04L 47/10 370/230 |
| 7,453,903 B2 * | 11/2008 | Chinitz | | 370/455 |
| 7,602,759 B2 * | 10/2009 | Kondo | | 370/338 |
| 8,036,225 B1 * | 10/2011 | Pawar et al. | | 370/395.21 |
| 8,098,745 B2 * | 1/2012 | Bertrand et al. | | 375/260 |
| 8,351,951 B2 * | 1/2013 | Hsieh et al. | | 455/450 |
| 2002/0099854 A1 * | 7/2002 | Jorgensen | | H04L 1/20 709/249 |
| 2003/0179756 A1 * | 9/2003 | Cain | | 370/395.42 |
| 2004/0151144 A1 | 8/2004 | Benveniste | | |

(Continued)

FOREIGN PATENT DOCUMENTS

| | | |
|---|---|---|
| WO | 03085891 A1 | 10/2003 |
| WO | 2005112488 A2 | 11/2005 |
| WO | 2005112488 A3 | 11/2005 |

OTHER PUBLICATIONS

EP Patent Application No. 10190198.1, Extended European Search Report dated Mar. 8, 2011.

(Continued)

*Primary Examiner* — Blake Rubin
(74) *Attorney, Agent, or Firm* — Moffat & Co.

(57) ABSTRACT

A method and apparatus for a back-off timer having different retry time classes, the method checking whether a connection establishment attempt for a first service on a connection slot is in a back-off time that equals or exceeds a predetermined threshold; and if yes, allowing a second service access to the connection slot.

17 Claims, 4 Drawing Sheets

(56) References Cited

U.S. PATENT DOCUMENTS

| | | | |
|---|---|---|---|
| 2005/0039101 A1* | 2/2005 | Torsner | 714/748 |
| 2005/0089045 A1* | 4/2005 | Shim et al. | 370/395.42 |
| 2005/0190784 A1* | 9/2005 | Stine | H04L 45/40 |
| | | | 370/445 |
| 2006/0034213 A1* | 2/2006 | Munje | H04W 28/18 |
| | | | 370/328 |
| 2006/0056441 A1* | 3/2006 | Jiang | 370/449 |
| 2007/0004391 A1* | 1/2007 | Maffeis | 455/418 |
| 2007/0047563 A1* | 3/2007 | Shvodian | H04L 12/4015 |
| | | | 370/412 |
| 2007/0064602 A1* | 3/2007 | Jiang | 370/229 |
| 2007/0275746 A1* | 11/2007 | Bitran | H04W 72/0446 |
| | | | 455/509 |
| 2008/0063000 A1* | 3/2008 | Shor | H04L 12/462 |
| | | | 370/401 |
| 2008/0144493 A1* | 6/2008 | Yeh | H04W 52/50 |
| | | | 370/230 |
| 2008/0192721 A1* | 8/2008 | Pernu et al. | 370/345 |
| 2009/0103501 A1* | 4/2009 | Farrag | H04W 74/02 |
| | | | 370/337 |
| 2009/0141738 A1* | 6/2009 | Li | H04L 12/413 |
| | | | 370/448 |
| 2009/0213815 A1* | 8/2009 | Sherman | H04W 74/0841 |
| | | | 370/336 |
| 2009/0316586 A1* | 12/2009 | Yi et al. | 370/242 |
| 2009/0323611 A1 | 12/2009 | Singh et al. | |
| 2010/0003818 A1* | 1/2010 | Imamura | H01L 21/76826 |
| | | | 438/666 |
| 2010/0014423 A1* | 1/2010 | Furuskar et al. | 370/235 |
| 2010/0162318 A1* | 6/2010 | Smith | 725/50 |
| 2010/0177701 A1* | 7/2010 | Maheshwari et al. | 370/328 |
| 2010/0246479 A1 | 9/2010 | Deu-Ngoc et al. | |
| 2011/0064013 A1* | 3/2011 | Liu | H04W 74/0816 |
| | | | 370/312 |
| 2011/0134829 A1* | 6/2011 | Chen et al. | 370/328 |
| 2011/0170468 A1* | 7/2011 | Jain | H04W 48/12 |
| | | | 370/312 |
| 2011/0274040 A1* | 11/2011 | Pani et al. | 370/328 |
| 2012/0106458 A1* | 5/2012 | Jang | H04L 67/327 |
| | | | 370/328 |
| 2012/0127969 A1* | 5/2012 | He | H04W 74/085 |
| | | | 370/336 |

OTHER PUBLICATIONS

Canadian Intellectual Property Office, Office Action, Application No. 2739063, Sep. 11, 2014.

* cited by examiner

METHOD AND APPARATUS FOR BACK-OFF ALGORITHM HAVING DIFFERENT RETRY TIME CLASSES

CROSS-REFERENCE TO RELATED APPLICATIONS

The present disclosure claims priority from U.S. provisional application No. 61/349,971, filed May 31, 2010, the contents of which are incorporated herein by reference.

FIELD OF THE DISCLOSURE

The present disclosure relates to radio bearers for mobile devices and in particular to the establishment of tunnels for communication from mobile devices.

BACKGROUND

A mobile device requires the establishment of a radio access bearer in order to communicate with the wireless network infrastructure. Furthermore, some devices allow the establishment of multiple radio access bearers for communications. In one instance, multiple radio access bearers can be dependent on the device requiring multiple packet data protocol (PDP) contexts. Thus, for example, a device may have a proprietary PDP context for the manufacturer of the device, a general wireless application protocol (WAP) context for browsing, a multimedia messaging service (MMS) PDP context for MMS applications, a streaming media PDP context for streaming media applications, among others. As will be appreciated, a PDP context is a term that is generally referred to in the third generation partnership project (3GPP) and more generally the term "tunnel" is used herein to refer to a data connection to a particular network.

Tunnels can be prioritized and if the number of tunnels that are allowed is less than the total number desired tunnels, the highest priority services will gain access to the tunnels.

If a closed tunnel is given access to a connection slot, the tunnel attempts to establish the connection. However, if a connection establishment fails, the non-connected tunnel holds on to the connection slot and waits for a retry time prior to trying to establish the connection again. The retry time may be progressive and thus the retry time may have a first value for a second connection attempt, a second value for a third connection attempt, up to a maximum time value. For example, if the connection establishment fails, the mobile device may wait 15 seconds before trying to establish the connection again. If this again fails, the back-off timer may be set to 30 seconds. The values may increase up to a maximum value. For example, the values could be 15 seconds, 30 seconds, 1 minute, 2 minutes, 4 minutes, 8 minutes and 15 minutes. Subsequent attempts to establish the connection will occur every 15 minutes.

During the back-off time, the connection slot may be held by the service trying to establish the connection.

BRIEF DESCRIPTION OF THE DRAWINGS

The present disclosure will be better understood with reference to the drawings in which.

DETAILED DESCRIPTION

Figure 1:
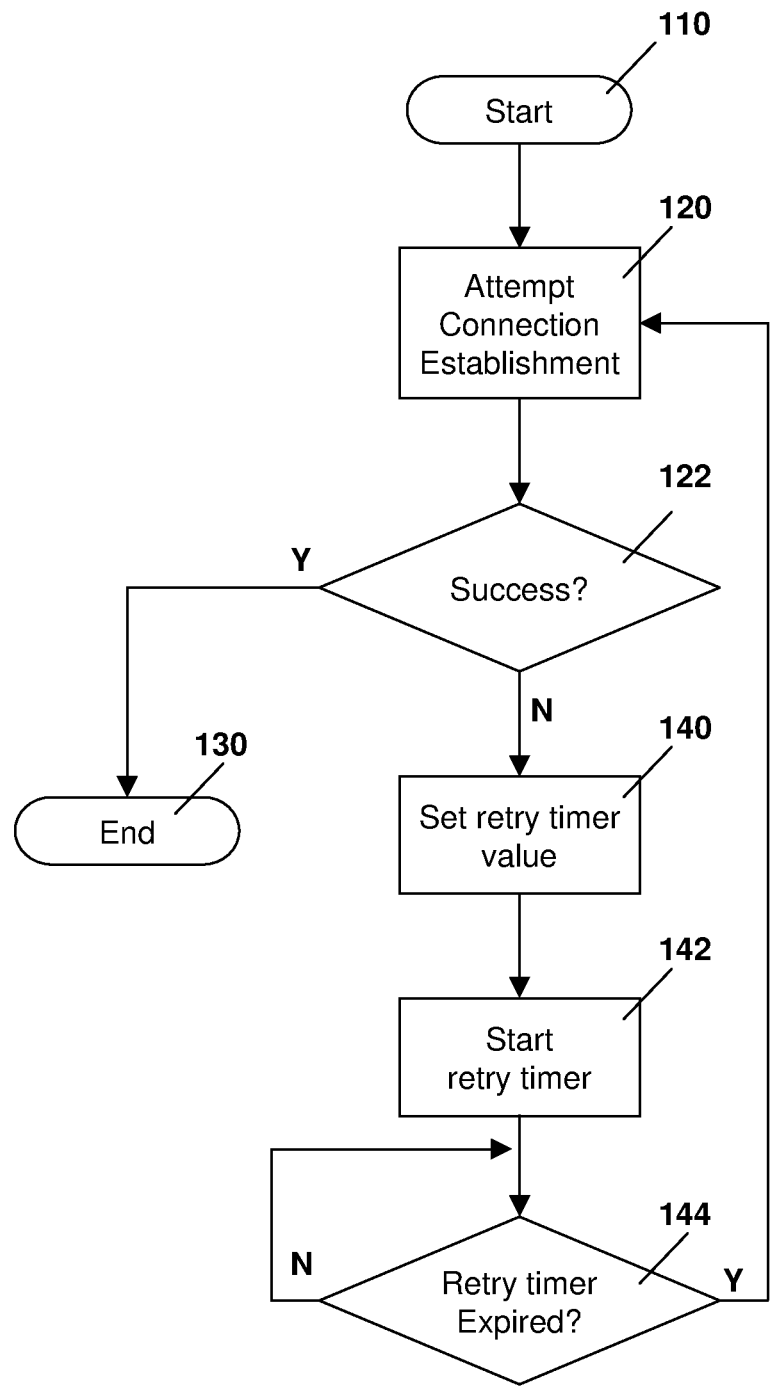
FIG. 1 is flow diagram showing a process for utilizing a back-off retry timer.

As used herein, the following definitions apply:
 a) Tunnel—refers to a data connection for one or more applications on a particular network; for 3GPP, this is a PDP context;
 b) Open tunnel—refers to a tunnel that is active;
 c) Closed tunnel—refers to a tunnel that is not active;
 d) Watermark—the number of tunnels that can be simultaneously opened on a device;
 e) Focused tunnel—this is the highest priority tunnel and by default the tunnel that is opened first;
 f) Device tunnel—this is a tunnel used for obtaining proprietary device services, such as, but not limited to, a proprietary email service.

The present disclosure provides a method comprising: checking, at a mobile device, whether a connection establishment attempt for a first service on a connection slot is in a back-off time that equals or exceeds a predetermined threshold; and if yes, allowing a second service access to the connection slot.

The present disclosure further provides a mobile device comprising: a processor; and a communications subsystem, wherein the processor and communications subsystem cooperate to: check whether a connection establishment attempt for a first service on a connection slot is in a back-off time that equals or exceeds a predetermined threshold; and if yes, allow a second service access to the connection slot.

A mobile device communicates with a network element through the use of tunnels. These tunnels are established between the mobile device and network to allow data to pass between the network and the device. For example, a web browser on the device may utilize a WAP tunnel to provide for the exchange of data.

Depending on the network and the device, the number of tunnels between the two may vary. Some networks may support only one tunnel and others may support multiple tunnels. The number of tunnels supported may also vary based on factors such as traffic load on the network.

Similarly, a device may be capable of supporting one or multiple tunnels. Further, a device may have a number of services which each require individual tunnels. These are closed tunnels until they are provided with a connection.

A watermark or maximum tunnel count provides an indication of how many tunnels can be opened on a particular network that the mobile device is registered with. Thus the total number of tunnels required by services on the mobile device can have a subset which are currently active, where the subset is no larger than the watermark.

Tunnels are provided with a priority based on a variety of factors. One prioritization algorithm is described in U.S. patent application Ser. No. 12/413,418, the contents of which are incorporated herein by reference.

Essentially, a tunnel prioritization process may include a set of registered tunnels, which provides an indication of all possible tunnels that are registered and could be activated. Examples include a WAP tunnel, an MMS tunnel, a streaming media tunnel, among others.

In one embodiment, the focused tunnel is given the highest priority. A focused tunnel is the tunnel servicing the application or service that is currently the focus on the mobile device. In particular, if a user of a device is watching a streaming video, an MMS tunnel may be the focused tunnel and be provided with the highest priority.

Other tunnels can be given lower priorities based on various criteria. For example, a device may have a "device tunnel" which provides services to proprietary functionality of the device. Thus, if the device is an always-on device with push email, the device tunnel can be used to provide the push email and can be set as the second highest priority tunnel.

Other processes running in the background can be provided with various priorities. The priorities for the other services could be defined based on which service was accessed most recently, where a more recently accessed service could be given a higher priority than a service which has been accessed less recently.

The above is merely meant as an example, and other prioritization schemes could be utilized to provide the set of possible tunnels with various priority levels.

In general, the highest priority tunnel needs to be activated, followed by the next highest priority level until the number of tunnels being activated matches the watermark for the device. Thus, if the watermark indicates that the network only supports one connection, then only one tunnel will be activated. Conversely, if the watermark indicates the network supports 3 tunnels, then 3 tunnels can be activated if three services on the device require connection.

In activating a tunnel, if the tunnel being activated attempts to establish a connection but is unsuccessful, the mobile device starts a back-off timer. As will be appreciated, this prevents the network from being bombarded with connection establishment requests when a connection may not be capable of being established.

Reference is now made to FIG. 1, which shows a process diagram for a back-off retry timer.

The process of FIG. 1 starts at block 110 and proceeds to block 120 in which the connection is attempted to be established for a tunnel that is not currently active. In one embodiment the connection establishment may be for the highest priority closed tunnel.

The process then proceeds to block 122 in which a check is made to determine whether the connection establishment was successful. If the connection establishment was successful the process proceeds from block 122 to block 130 in which the process ends.

Conversely, if the connection establishment was unsuccessful, the process proceeds to block 140 in which a retry timer value is set. As will be appreciated by those in the art, the retry timer value may be an incremental timer value. Thus, for example, on the first failure the retry timer value may be 15 seconds and the value may double for each unsuccessful connection attempt until a maximum value is reached. For example, such a maximum value could be 15 minutes. Thus, the values set in the block 140 could increment from 15 seconds, to 30 seconds, to 1 minute, to 2 minutes, to 4 minutes, to 8 minutes and finally to 15 minutes and continue to be set at 15 minutes subsequently. This is however only an example.

The proceeds then proceeds from block 140 to block 142 in which the retry timer is started.

From block 142, the process proceeds to block 144 in which a check is made to determine whether the retry timer has expired. If no, the process continues to loop back to block 144 until the retry timer has expired. The loopback to block 144 is merely meant as an example, and in other implementations the process may use an interrupt upon timer expiry to continue. Other examples of implementing the timer would also be known to those skilled in the art having reference to the present disclosure.

From block 144 the process proceeds to block 120 in which a connection establishment is attempted for the same closed tunnel as previously tried.

From block 120 the process can then continue to block 122 to determine if there was success and if not the retry timer value is incremented at block 140 as indicated above.

While the embodiment of FIG. 1 prevents the network from being bombarded with connection establishment requests, the open tunnel slot may be held by the tunnel attempting to establish the connection. The holding of the slot may prevent other closed tunnels from becoming open tunnels, and therefore prevent data from being provided to the device.

For example, in the case when only one open tunnel is allowed, the device may make a connection establishment attempt for the highest priority tunnel. If the connection establishment is unsuccessful for whatever reason, such as a non-stalling failure, the back-off timer will be started and the device will wait 15 seconds prior to trying to re-establish the connection. Subsequent attempts will increase the back-off time value. During such back-off time, the connection slot is held by the highest priority closed tunnel, thereby preventing other services from potentially using the slot.

In one embodiment, if the back-off time is sufficiently long, a second service could utilize the connection slot during the back-off time of the first service.

As will be appreciated, the back-off time needs to be sufficiently long to outweigh the signaling costs, and associated battery usage on the device, for establishing the second service. Since the second service would have to give up the connection slot at the expiry of the back-off timer for the first service, if the back-off time is short then the establishment of the tunnel for the second service may not be beneficial.

Conversely, a long back-off time may be sufficient for a second service to exchange data before being required to give up the connection, and thus the establishment of a connection for the second service may be beneficial.

In the present disclosure, a "long back-off" is defined to be a back-off that exceeds a predetermined threshold and a "short back-off" is a back-off is less than the predetermined threshold. The threshold could be a default threshold set by a device manufacturer, or could be provisioned or configured up by a user, network, carrier or other entity.

For example, a threshold may be set to be 4 minutes. If the back-off timer is less than 4 minutes then the back-off timer could be considered to be a short back-off whereas if the back-off timer is 4 minutes or more then it could be considered to be a long back-off.

In a further embodiment, the threshold may be based on the service requesting the tunnel. Thus, a first service might have a threshold value of 1 minute, while a second service might have a threshold value of 4 minutes. If the back-off time is greater than 1 minute, the first service may be provided with access to the tunnel, in this embodiment.

Figure 2:
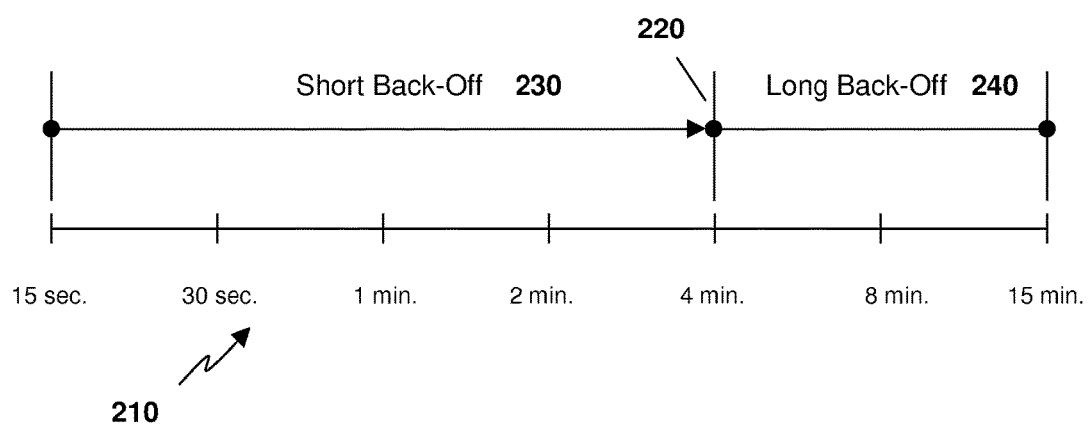
FIG. 2 is block diagram illustrating a threshold between a long and short back-off time for a set of discrete back-off time values.

Reference is now made to FIG. 2, which shows a set of back-off time values and a threshold between a long and short back-off time.

In FIG. 2, a set of possible discrete back-off times 210 are provided. In the example of FIG. 2, these range from 15 seconds to 15 minutes. However, this is not meant to be limiting and any possible back-off time values can be used with the methods and systems herein.

A threshold 220 is configured to distinguish between a short back-off 230 and a long back-off 240. As indicated above, the threshold 220 can be set by a device manufacturer during the manufacture of the device, or the value can be set by the network, carrier, user or other entity. For example, signaling between the network and mobile device can include the threshold value, either in dedicated messages or as part of other configuration messages.

The threshold 220 in the example of FIG. 2 is set at 4 minutes. Since this is one of the discrete back-off times, the value at the threshold is defined to be a long back-off. In other embodiments, the threshold value could be included within the short back-off, or the threshold could be configured at a value between the discrete back-off times.

Figure 3:
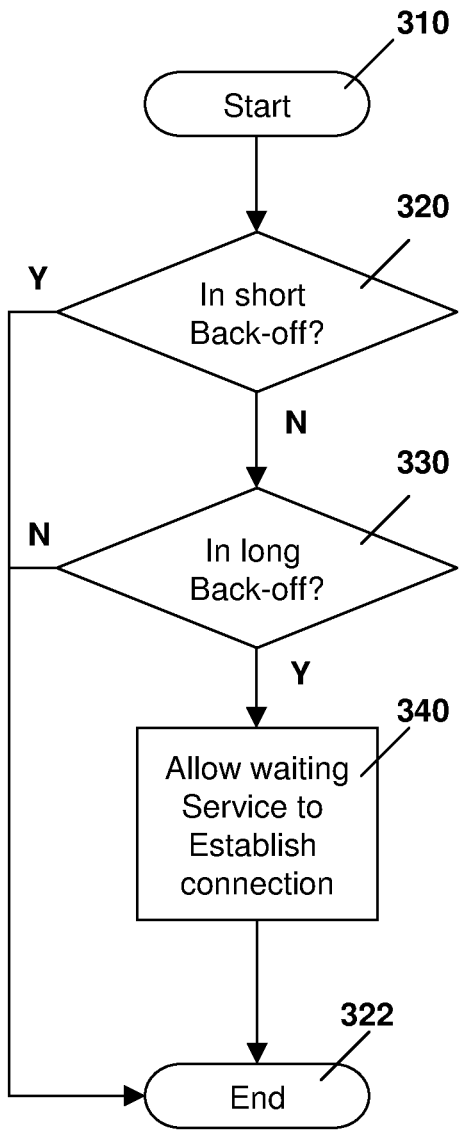
FIG. 3 is a flow diagram showing a process for allowing a second service access to a connection slot during a long back-off time.

The distinguishing between a long back-off, where other services can access a connection slot, and a short back-off, where the device holds the connection slot for the tunnel that the device previously tried to establish the connection for, allows usage of an idle connection slot when conditions permit. Reference is now made to FIG. 3.

In FIG. 3 the process starts at block 310 and proceeds to block 320 in which a check is made to determine whether the connection establishment is in a short back-off. If yes, the process proceeds to block 322 and ends.

If, in block 320, it is determined that the process is not in a short back-off the process proceeds to block 330 in which a check is made to determine whether the connection is establishment is in a long back-off. As will be appreciated, If no, the process proceeds to block 322 and ends.

Conversely, if it is determined in block 330 that the process is in a long back-off, the process proceeds to block 340 in which a waiting service is allowed to establish a connection. The priority of waiting services could be used as a determining factor to decide which service is provided with the connection slot. Thus, in one embodiment, the highest priority closed tunnel (after the tunnel currently in back-off) is allowed to establish a connection.

As will be appreciated by those in the art, in some embodiments the checks at blocks 320 and 330 could be combined into a single check to determine whether the device is in short or long back-off.

The process then proceeds to block 322 and ends.

Based on the above, FIG. 3 shows a back-off retry algorithm that distinguishes between long and short back-off times to provide service to a maximum set of tunnels while minimizing signaling. The process allows the retry of a tunnel activation procedure upon non stalling failure. However, if it is determined that the connection establishment attempt is in a long back-off, other closed tunnels could be allowed to be established.

For example, if an MMS notification arrives at the device, the MMS data connection may be allowed to be established while the primary tunnel is the long back-off. The user will therefore be allowed to retrieve the MMS prior to the long back-off time expiry.

In a further example, the distinction between long and short back-offs may be illustrated in the case of a device tunnel versus a focus tunnel on a network which only allows one tunnel to be opened. Without the back-off retry algorithm of FIG. 3, if the focused tunnel continues to be rejected with a non-stalling cause, the device service could potentially be down for a long time. Thus, on an always-on device receiving push email, the email service may be interrupted for a significant duration while the connection is attempted to be established for the focused tunnel.

To handle this, when the focused tunnel connection establishment is in a long back-off, other closed tunnels such as the device tunnel may be considered for activation.

By not considering the activation of closed tunnels during the short back-off period, signaling may be minimized. Specifically, during short back-off, other tunnels will be short lived since the tunnel needs to be torn down at the back-off time expiry. Thus, during a back-off period which is less than the long threshold, the network, carrier, device manufacturer or user may consider the signaling required to establish a tunnel to be too great when compared with the duration that the tunnel will be active. Once the threshold for long back-off time is reached, the network, carrier, device manufacturer or user may consider the signaling costs to be worthwhile.

Figure 4:
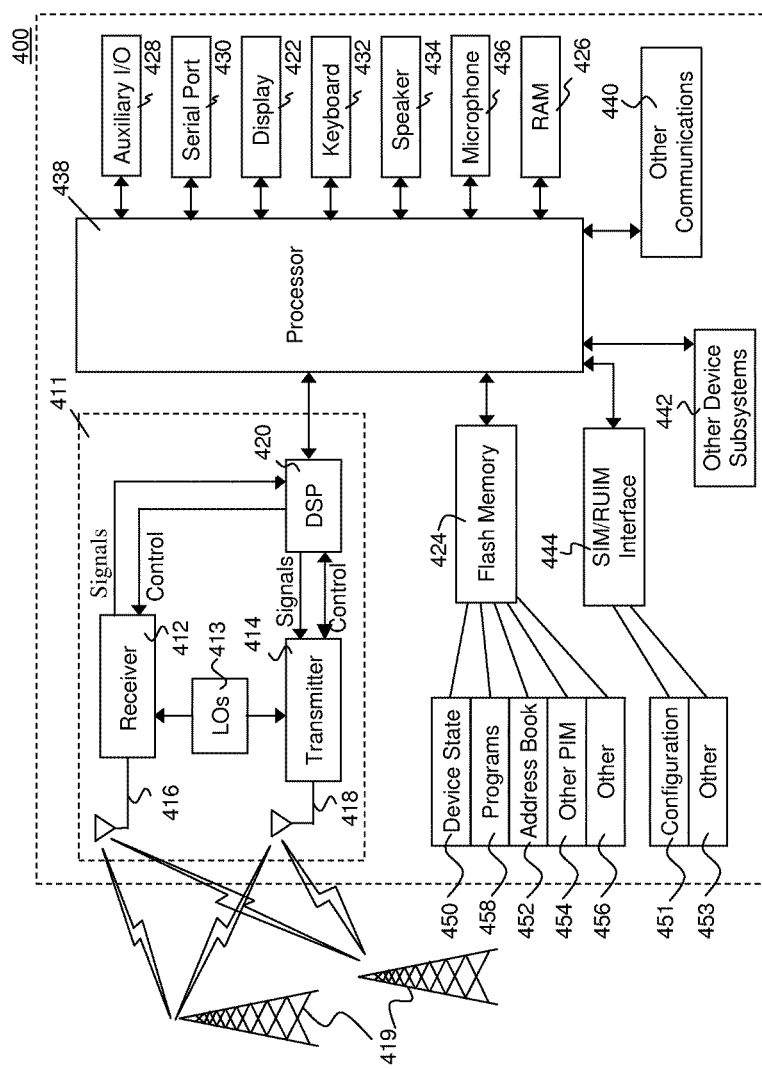
FIG. 4 is a block diagram of an exemplary mobile device capable of being used with the processes of the present disclosure.

As will be appreciated, the configuring and checking the threshold, the checking of radio access bearers/tunnels and the establishing radio access bearers/tunnels is done utilizing the processor on a mobile device, in combination with a communications subsystem of the mobile device. One such exemplary mobile device is illustrated below with reference to FIG. 4. The mobile device of FIG. 4 is however not meant to be limiting and other mobile devices could also be used.

Mobile device 400 is typically a two-way wireless communication device having voice and data communication capabilities. Mobile device 400 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 400 is enabled for two-way communication, it will incorporate a communication subsystem 411, including both a receiver 412 and a transmitter 414, as well as associated components such as one or more antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the device is intended to operate.

Network access requirements will also vary depending upon the type of network 419. In some CDMA networks network access is associated with a subscriber or user of mobile device 400. A CDMA mobile device may require a removable user identity module (RUIM) or a subscriber identity module (SIM) card in order to operate on a CDMA network. The SIM/RUIM interface 444 is normally similar to a card-slot into which a SIM/RUIM card can be inserted and ejected like a diskette or PCMCIA card. The SIM/RUIM card can have memory and hold many key configuration 451, and other information 453 such as identification, and subscriber related information.

When required network registration or activation procedures have been completed, mobile device 400 may send and receive communication signals over the network 419. As illustrated in FIG. 4, network 419 can consist of multiple base stations communicating with the mobile device. For example, in a hybrid CDMA 1×EVDO system, a CDMA base station and an EVDO base station communicate with the mobile station and the mobile device is connected to both simultaneously. The EVDO and CDMA 1× base stations use different paging slots to communicate with the mobile device.

Signals received by antenna 416 through communication network 419 are input to receiver 412, which may perform such common receiver functions as signal amplification, frequency down conversion, filtering, channel selection and the like, and in the example system shown in FIG. 4, analog to digital (A/D) conversion. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Mobile device 400 generally includes a processor 438 which controls the overall operation of the device. Communication functions, including data and voice communications, are performed through communication subsystem 411. Processor 438 also interacts with further device subsystems such as the display 422, flash memory 424, random access memory (RAM) 426, auxiliary input/output (I/O) subsystems 428, serial port 430, one or more keyboards or keypads 432, speaker 434, microphone 436, other communication subsystem 440 such as a short-range communications subsystem and any other device subsystems generally designated as 442. Serial port 430 could include a USB port or other port known to those in the art.

Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the processor 438 may be stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements. Processor 438, in addition to its operating system functions, may enable execution of software applications on the mobile device. A predetermined set of applications that control basic operations, including at least data and voice communication applications for example, will normally be installed on mobile device 400 during manufacturing. Other applications could be installed subsequently or dynamically.

Applications and software, such as those for implements the process of FIG. 3, may be stored on any computer readable storage medium. The computer readable storage medium may be a tangible or intransitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application may have the ability to send and receive data items, via the wireless network 419. In one embodiment, the PIM data items are seamlessly integrated, synchronized and updated, via the wireless network 419, with the mobile device user's corresponding data items stored or associated with a host computer system. Further applications may also be loaded onto the mobile device 400 through the network 419, an auxiliary I/O subsystem 428, serial port 430, short-range communications subsystem 440 or any other suitable subsystem 442, and installed by a user in the RAM 426 or a non-volatile store (not shown) for execution by the processor 438. Such flexibility in application installation increases the functionality of the device and may provide enhanced on-device functions, communication-related functions, or both. For example, secure communication applications may enable electronic commerce functions and other such financial transactions to be performed using the mobile device 400.

In a data communication mode, a received signal such as a text message or web page download will be processed by the communication subsystem 411 and input to the processor 438, which may further process the received signal for output to the display 422, or alternatively to an auxiliary I/O device 428.

A user of mobile device 400 may also compose data items such as email messages for example, using the keyboard 432, which may be a complete alphanumeric keyboard or telephone-type keypad, among others, in conjunction with the display 422 and possibly an auxiliary I/O device 428. Such composed items may then be transmitted over a communication network through the communication subsystem 411.

For voice communications, overall operation of mobile device 400 is similar, except that received signals would typically be output to a speaker 434 and signals for transmission would be generated by a microphone 436. Alternative voice or audio I/O subsystems, such as a voice message recording subsystem, may also be implemented on mobile device 400. Although voice or audio signal output is preferably accomplished primarily through the speaker 434, display 422 may also be used to provide an indication of the identity of a calling party, the duration of a voice call, or other voice call related information for example.

Serial port 430 in FIG. 4 would normally be implemented in a personal digital assistant (PDA)-type mobile device for which synchronization with a user's desktop computer (not shown) may be desirable, but is an optional device component. Such a port 430 would enable a user to set preferences through an external device or software application and would extend the capabilities of mobile device 400 by providing for information or software downloads to mobile device 400 other than through a wireless communication network. The alternate download path may for example be used to load an encryption key onto the device through a direct and thus reliable and trusted connection to thereby enable secure device communication. As will be appreciated by those skilled in the art, serial port 430 can further be used to connect the mobile device to a computer to act as a modem.

Other communications subsystems 440, such as a short-range communications subsystem, is a further optional component which may provide for communication between mobile device 400 and different systems or devices, which need not necessarily be similar devices. For example, the subsystem 440 may include an infrared device and associated circuits and components or a Bluetooth™ communication module to provide for communication with similarly enabled systems and devices.

While the above examples utilize PDP contexts in 3GPP networks such as HSDPA networks, the solution is equally applicable to other networks, which include but are not limited to Universal Mobile Telecommunications System (UMTS) networks, Global System for Mobile telephony (GSM) networks, Long Term Evolution (LTE) networks, among others. For example, in UMTS, the channels are cumulative and the data must therefore be shared between the channels.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method on a mobile device comprising:
    reserving a connection slot for a first service of the mobile device, the reserving preventing other services from using the connection slot;
    attempting to establish a connection for the first service on the connection slot;
    determining that the connection establishment was unsuccessful;
    selecting a back-off time based on a number of unsuccessful connection attempts;
    determining whether the back-off time is a short back-off time or a long back-off time based on a threshold, wherein the back-off time is the short back-off time if it is less than the threshold, and the back-off time is the long back-off time if it is greater than the threshold;
    if the back-off time is the short back-off time, preventing other services from using the connection slot; and
    if the back-off time is the long back-off time, establishing a connection for a second service of the mobile device on the connection slot.

2. The method of claim 1, wherein the threshold is configured based on the second service, configured by signaling between the mobile device and a network element, or configurable on the mobile device.

3. The method of claim 1, wherein the connection attempt by the first service attempts to establish a tunnel between the mobile device and a network element.

4. The method of claim 3, wherein the tunnel is a packet data protocol context on a radio access bearer.

5. The method of claim 1, wherein the second service has a lower priority than the first service.

6. The method of claim 5, wherein the second service is selected from a plurality of services with closed tunnels, the second service having a higher priority than remaining services in the plurality of services.

7. The method of claim 1, wherein the connection establishment request previously failed to establish a connection based on a non-stalling cause.

8. A mobile device comprising:
    a processor; and
    a communications subsystem,
    wherein the processor and communications subsystem cooperate to:
        reserve a connection slot for a first service of the mobile device, the reserving preventing other services from using the connection slot;
        attempt to establish a connection for the first service on the connection slot;
        determine that the connection establishment was unsuccessful;
        select a back-off time based on a number of unsuccessful connection attempts;
        determine whether the back-off time is a short back-off time or a long back-off time based on a threshold, wherein the back-off time is the short back-off time if it is less than the threshold, and the back-off time is the long back-off time if it is greater than the threshold;
        if the back-off time is the short back-off time, prevent other services from using the connection slot; and
        if the back-off time is the long back-off time, establish a connection for a second service of the mobile device on the connection slot.

9. The mobile device of claim 8, wherein the threshold is configured during manufacture of the mobile device, configured by signaling between the mobile device and a network element, or configurable on the mobile device.

10. The mobile device of claim 8, wherein the connection attempt by the first service attempts to establish a tunnel between the mobile device and a network element.

11. The mobile device of claim 10, wherein the tunnel is a packet data protocol context on a radio access bearer.

12. The mobile device of claim 8, wherein the second service has a lower priority than the first service.

13. The mobile device of claim 12, wherein the second service is selected from a plurality of services with closed tunnels, the second service having a higher priority than remaining services in the plurality of services.

14. The mobile device of claim 8, wherein the connection establishment request previously failed to establish a connection based on a non-stalling cause.

15. A non-transitory computer-readable medium having instructions stored thereon for execution by a processor of a mobile device, the instructions comprising code for:
    reserving a connection slot for a first service of the mobile device, the reserving preventing other services from using the connection slot;
    attempting to establish a connection for the first service on the connection slot;
    determining that the connection establishment was unsuccessful;
    selecting a back-off time based on a number of unsuccessful connection attempts;
    determining whether the back-off time is a short back-off time or a long back-off time based on a threshold, wherein the back-off time is the short back-off time if it is less than the threshold, and the back-off time is the long back-off time if it is greater than the threshold;
    if the back-off time is the short back-off time, preventing other services from using the connection slot; and
    if the back-off time is the long back-off time, establishing a connection for a second service of the mobile device on the connection slot.

16. The non-transitory computer-readable medium of claim 15, wherein the threshold is configured based on the second service, configured by signaling between the mobile device and a network element, or configurable on the mobile device.

17. The non-transitory computer-readable medium of claim 15, wherein the connection attempt by the first service attempts to establish a tunnel between the mobile device and a network element.

\* \* \* \* \*